Patented Aug. 7, 1951

2,563,779

UNITED STATES PATENT OFFICE 2,563,779

RECOVERY OF PENICILLIN FROM FERMENTATION BROTH

Robert K. Finn, Westfield, N. J., assignor to Merck & Co., Inc., Rahway, N. J., a corporation of New Jersey No Drawing. Application February 10, 1945, Serial No. 577,345

2 Claims. (Cl. 260—239.1)

This invention relates to processes for producing penicillin and particularly to processes for extracting penicillin from culture broth containing the same.

In extracting penicillin from acidified culture broth by means of organic solvents considerable difficulty has been experienced due to emulsion formation and the resulting failure to obtain a sharp separation between the solvent and the broth. Extraction of penicillin has therefore been characterized by a low percentage recovery of the penicillin actually present in the broth as well as by the carrying over of considerable amounts of impurities from the broth to the solvent, thus complicating further steps of purification of the penicillin. To minimize these disadvantages it has been customary to employ excess amounts of solvent, for example, a broth to solvent ratio of 1:1 is not uncommon. Such use of excess solvent is itself objectionable both from the standpoint of additional handling costs and additional costs for the solvent used.

It is now discovered, according to the present invention, that when small amounts (viz., 0.01 to 0.2% by weight based upon the broth used) of certain organic, wetting, dispersing, or surface-active agents are added to the acidified broth emulsion formation during solvent extraction of the broth is prevented, and separation of the spent broth and rich solvent is rapid and substantially complete. This is surprising and unexpected because the usual function of a wetting or dispersing agent is to aid in forming, rather than preventing formation of, an emulsion.

An explanation of the unexpected result obtained by addition of a wetting agent is that particles of near-colloidal dimensions present in the acidified aqueous broth collect at the broth-non-aqueous-solvent interface causing emulsion formation when broth and solvent are mixed, and that the added agent causes wetting of these particles by the aqueous component thus preventing their collection at the interface and eliminating the factor evidently responsible for emulsion formation.

Wetting agents suitable for the prevention of emulsions in this extraction process include alkali metal salts of higher aliphatic sulfonic and sulfuric acids and alkyl substituted aryl sulphonic acids. The following readily available compositions of this well-recognized general class have been found most effective:

1. Alkali metal mono-salts of monobutyl diphenyl sulfonic acid.

2. Mixed alkali metal salts of alkylated aryl sulfonic acid.

3. Alkali metal mono-salts of poly-alkyl substituted benzene sulfonic acid.

4. Alkali metal mono-salts of the dioctyl ester of sulfosuccinic acid.

5. Alkali metal salts of higher aliphatic sulfuric acids (such as—

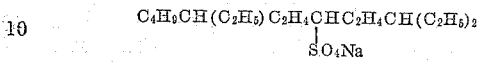

and the sodium salt of technical lauryl sulfate).

The use of a wetting agent to prevent emulsion formation in the solvent extraction of acidified penicillin broth is applicable to extraction processes generally wherein the solvent is a substantially water-immiscible aliphatic ketone or ester containing at least 4 carbon atoms. Thus with most of the solvents which are known to be suitable for penicillin extraction the formation of emulsion is prevented by the addition of small amounts of a wetting agent.

Regarded in certain of its broader aspects the novel process, according to this invention, comprises adding to acidified penicillin broth a small amount of an organic wetting agent, extracting the broth with an organic solvent of the class consisting of substantially water-immiscible aliphatic ketones and esters containing at least 4 carbon atoms thereby obtaining sharply stratified penicillin enriched solvent and spent broth layers, and separating said layers.

The class of solvents referred to above includes ketones such as methyl isobutyl ketone, and methyl ethyl ketone; and esters such as isopropyl acetate, butyl acetate, amyl acetate, and "Pentacetate" (acetates of mixed five-carbon alcohols derived from petroleum). In the case of methyl ethyl ketone which is moderately soluble in water, it is advisable to add benzene to form a substantially water-immiscible solvent.

The following examples illustrate methods of carrying out the present invention but it is to be understood that these examples are given by way of illustration and not of limitation.

Example I

To about 5 parts by volume of filtered penicillin broth, acidified in the usual manner to a pH of about 2 with mineral acid ($H_3PO_4$), is added approximately 0.05% (0.5 mgm. per cc. of broth) of "Aerosol OT" (dioctyl ester of sodium sulfo succinic acid). About 1 part by volume of amyl acetate is added, the mixture is agitated, and then allowed to stand. Within five minutes there is a sharp separation between the solvent layer and the broth layer. The broth layer is clear and the solvent layer is substantially clear, the unseparated portion thereof being in the form of large globules.

Upon repeating the foregoing procedure with the "Aerosol OT" omitted, the agitated extraction mixture formed a persistent emulsion and failed to show any sharp separation between the solvent and broth layers after standing overnight.

*Example II*

About 5 volumes of acidified penicillin broth and about 1 volume of amyl acetate are mixed together and fed to a centrifugal separator at a broth rate of 5 gal. per minute. The effluent amyl acetate contains about 2% of emulsion. Lower rates of feed do not prevent the emulsion.

Upon repeating the foregoing procedure using broth to which approximately 0.05% (by weight) of "Ultrawet" (alkylated monosodium benzene sulfonate) is added, the effluent amyl acetate contains no emulsion even when the broth feed rate is increased to 8 gallons per minute.

When about 0.05% of "Aerosol OT" is used in place of "Ultrawet" the effluent amyl acetate contains no emulsion even when the broth feed rate is increased to 9 gallons per minute.

Modifications may be made in carrying out the present invention without departing from the spirit and scope thereof, and the invention is to be limited only by the appended claims.

What is claimed is:

1. The process that comprises adding to acidified penicillin culture broth 0.01 to 0.2% of an alkali metal salt of an alkyl substituted aryl sulfonic acid, extracting the broth with an organic solvent of the class consisting of substantially water-immiscible aliphatic ketones and esters containing at least four carbon atoms, thereby obtaining sharply stratified penicillin enriched solvent and spent broth layers, and separating said layers.

2. In a process for extracting acidified penicillin broth with organic solvent without emulsion formation the step that comprises adding to the acidified broth before extraction 0.01 to 0.2% of an alkali metal salt of an alkyl substituted aryl sulfonic acid.

ROBERT K. FINN.

REFERENCES CITED

The following references are of record in the file of this patent:

UNITED STATES PATENTS

| Number | Name | Date |
|--------|------|------|
| 1,842,934 | DeGroote | Jan. 26, 1932 |
| 2,134,770 | Katzman | Dec. 26, 1939 |
| 2,255,252 | Harris | Sept. 9, 1941 |
| 2,262,741 | DeGroote | Nov. 11, 1941 |
| 2,372,623 | Zinner | Mar. 27, 1945 |
| 2,448,790 | Foster et al. | Sept. 7, 1948 |

OTHER REFERENCES

Synthetic Organic Chemicals, by Union Carbon and Carbide Corp., 12 ed., page 89.

Penn State College, "Penicillin Interim Report," 44—35, May 2, 1944.

Abraham, Brit. J. of Exp. Pathology, June 23, 1942, pp. 103–116.

"The Condensed Chemical Dictionary," 3rd edition (1942), page 51.

Minne, Proceeding of World Petroleum Congress (London), 1933, page 516.